(12) United States Patent
Richter et al.

(10) Patent No.: US 12,524,975 B2
(45) Date of Patent: Jan. 13, 2026

(54) DISPLAY OF VIRTUAL CONTENT BASED ON SPATIAL RELATIONSHIP

(71) Applicant: SpaceCraft, Inc., Beverly Hills, CA (US)

(72) Inventors: Ian M. Richter, Los Angeles, CA (US); Alexis R. Haraux, Seattle, WA (US)

(73) Assignee: SpaceCraft, Inc., Beverly Hills, CA (US)

( * ) Notice: Subject to any disclaimer, the term of this patent is extended or adjusted under 35 U.S.C. 154(b) by 144 days.

(21) Appl. No.: 18/538,686

(22) Filed: Dec. 13, 2023

(65) Prior Publication Data

US 2024/0193879 A1    Jun. 13, 2024

Related U.S. Application Data

(60) Provisional application No. 63/432,261, filed on Dec. 13, 2022.

(51) Int. Cl.
*G06T 19/00* (2011.01)
*G06T 7/70* (2017.01)

(52) U.S. Cl.
CPC .............. *G06T 19/006* (2013.01); *G06T 7/70* (2017.01); *G06T 2207/20092* (2013.01)

(58) Field of Classification Search
CPC ................. G06T 19/006; G06T 7/70; G06T 2207/20092
See application file for complete search history.

(56) References Cited

U.S. PATENT DOCUMENTS

| | | | |
|---|---|---|---|
| 9,183,676 B2 | 11/2015 | Mcculloch et al. | |
| 9,349,218 B2 | 5/2016 | Keating et al. | |
| 9,443,355 B2 | 9/2016 | Chan et al. | |
| 2014/0225919 A1* | 8/2014 | Kaino | H04N 7/183 345/633 |
| 2014/0267407 A1* | 9/2014 | Mullins | G06T 15/20 345/633 |
| 2015/0317831 A1* | 11/2015 | Ebstyne | G06F 3/011 345/419 |
| 2016/0247324 A1* | 8/2016 | Mullins | G02B 27/0179 |
| 2018/0101223 A1* | 4/2018 | Ishihara | G02B 27/0172 |
| 2022/0092862 A1* | 3/2022 | Faulkner | G06V 40/18 |

* cited by examiner

*Primary Examiner* — Jeffery A Brier
(74) *Attorney, Agent, or Firm* — Fernando & Partners, LLP

(57) ABSTRACT

In one implementation, a method of displaying virtual content is performed at a device in a physical environment, the device having a display, one or more processors, and non-transitory memory. The method includes detecting an object in the physical environment. The method includes determining that a spatial relationship between the device and the object satisfies one or more display criteria. The method includes, in response to determining that the spatial relationship between the device and the object satisfies the one or more display criteria, displaying, on the display, virtual content.

20 Claims, 12 Drawing Sheets

300

┌─ 310
At a device in a physical environment, the device having a display, one or more processors, and non-transitory memory:

Detecting an object in the physical environment

┌─ 320
Determining that a spatial relationship between the device and the object satisfies one or more display criteria ┌─ 330
In response to determining that the spatial relationship between the device and the object satisfies the one or more display criteria, displaying, on the display, virtual content

DISPLAY OF VIRTUAL CONTENT BASED ON SPATIAL RELATIONSHIP

CROSS-REFERENCE TO RELATED APPLICATIONS

This application claims priority to U.S. Provisional Patent App. No. 63/432,261, filed on Dec. 13, 2022, which is hereby incorporated by reference in its entirety.

TECHNICAL FIELD

The present disclosure generally relates to displaying virtual content.

BACKGROUND

In various implementations, virtual content is displayed on a device in response to a trigger. For example, the virtual content may be displayed in response to detecting an object in a physical environment or in response to a user input.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
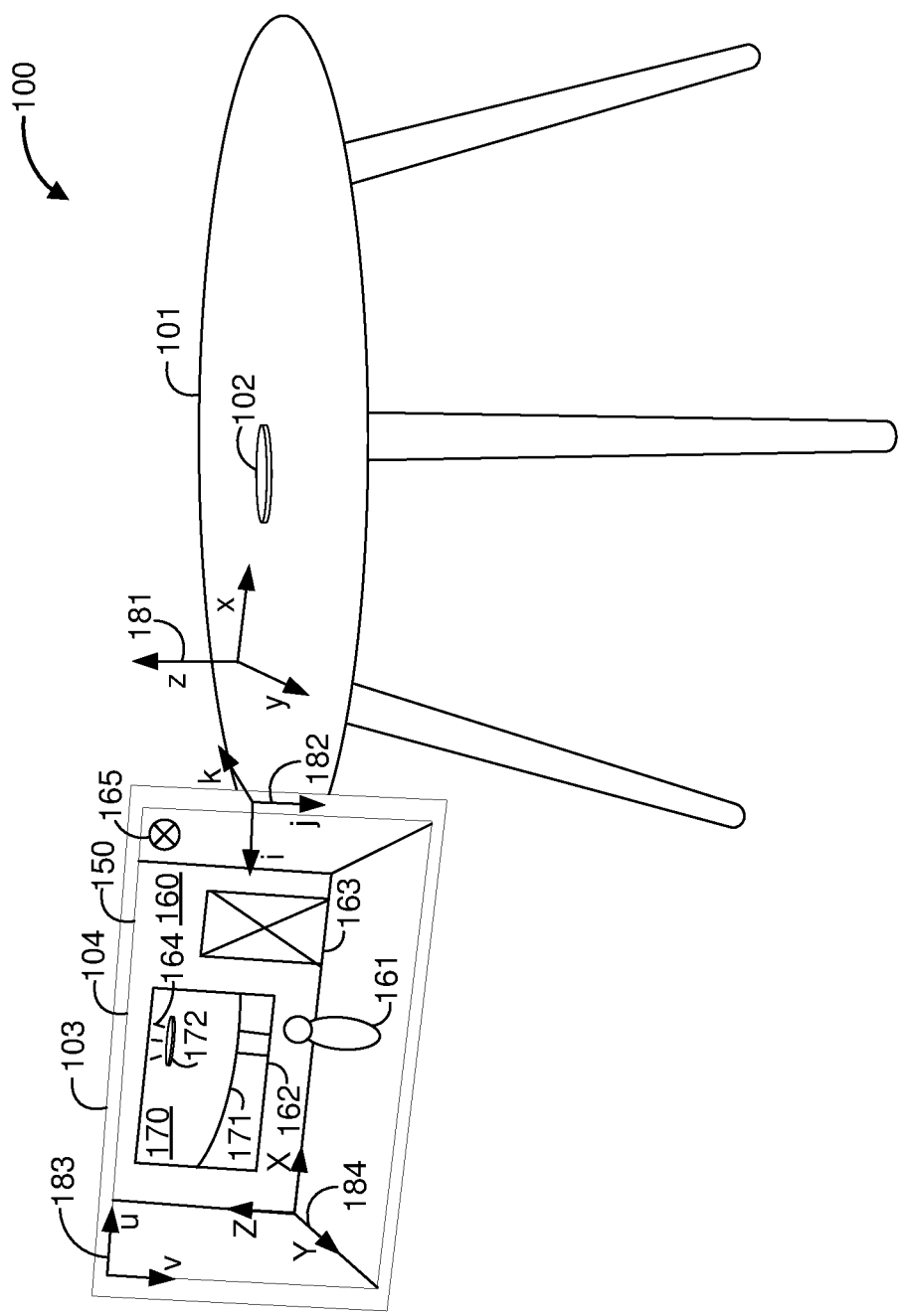
FIGS. 1A-1G illustrate a first physical environment at a series of times.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for displaying virtual content. In various implementations, the method is performed at a device in a physical environment, the device having a display, one or more processors, and non-transitory memory. The method includes detecting an object in the physical environment. The method includes determining that a spatial relationship between the device and the object satisfies one or more display criteria. The method includes, in response to determining that the spatial relationship between the device and the object satisfies the one or more display criteria, displaying, on the display, virtual content.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

To provide a mixed reality (MR) experience, a device displays virtual content in association with a representation of a physical environment. In various implementations, the device includes a camera and a display. The device captures, using the camera, an image of a physical environment and displays, using the display, the image of the physical environment composited with virtual content. In various implementations, the virtual content is displayed in response to detecting a trigger. For example, in response to detecting an object in the image of the physical environment, the device displays virtual content in association with the object. As another example, in various implementations, the device displays virtual content in response to detecting that a spatial relationship between the device and the object in the physical environment satisfies one or more display criteria.

FIGS. 1A-1G illustrate a first physical environment 100 at a series of times. The first physical environment 100 includes a physical table 101 and a physical coin 102 on the physical table 101. The first physical environment 100 includes a physical electronic device 103 (hereinafter "device 103") including a display 104 via which the device 103 displays a first mixed reality (MR) application.

While the device 103 executes the first MR application, the device 103 emulates a spaceship in the first physical environment 100. Thus, the device 103 displays a MR environment 150 including a virtual cockpit 160. The virtual cockpit 160 has a virtual viewport 162 through which the device 103 displays a physical environment representation 170 of a portion of the first physical environment 100. The physical environment representation 170 includes a table representation 171 of the physical table 101 and a coin representation 172 of the physical coin 102. In various implementations, the device 103 includes a camera directed towards a portion of the first physical environment 100 and the physical environment representation 170 displays at least a portion of an image captured by the camera. In various implementations, the portion of the image is augmented with virtual content. For example, in FIG. 1A, the physical environment representation 170 includes a virtual glow 164 displayed around the coin representation 172. The virtual cockpit 160 further includes a virtual hatch 163 which, when opened, also shows the physical environment representation 170. The MR environment 150 includes a virtual close button 165 which, when selected by a user, causes the device 103 to cease displaying the first MR application.

The MR environment 150 includes a virtual pilot 161. While the device 103 executes the first MR application, a user moves the device 103 in the first physical environment 100. Physical objects in the first physical environment 100 correspond to resources in the first MR application. For example, physical money objects (e.g., coins or bills) correspond to financial resources and physical books correspond to technological resources. When a physical object corresponding to a resource is detected in the first physical environment 100, the user is instructed to move the device 103 into a spatial relationship with the physical object that satisfies one or more display criteria. When the device 103 is in the spatial relationship with the physical object that satisfies the one or more display criteria, the virtual hatch 163 opens and the virtual pilot 161 exits the spaceship through the virtual hatch 163. The virtual pilot 161 interacts with the physical object to obtain resources. In various implementations, the resources can be used to upgrade the spaceship or perform other tasks.

The first physical environment 100 is associated with a three-dimensional physical-world coordinate system (represented by the axes 181) in which a point in the physical-world coordinate system includes an x-coordinate, a y-coordinate, and a x-coordinate. The camera is associated with a three-dimensional camera coordinate system (represented by the axes 182) in which a point in the camera coordinate system includes an i-coordinate, a j-coordinate, and a k-coordinate. The k-axis of the camera coordinate system corresponds to the optical axis of the camera. The physical-world coordinate system and the camera coordinate system are related by a transform based on the pose (e.g., the three-dimensional location and three-dimensional orientation) of the camera (and the device 103) in the physical-world coordinate system. Thus, when the three-dimensional coordinates of a point in the physical-world coordinate system and the pose of the device 103 in the physical-world coordinate system are known, the three-dimensional coordinates of the point in the camera coordinate system can be determined.

Further, the display 104 of the device 103 is associated with a two-dimensional display coordinate system (represented by the axes 183) in which a point in the display coordinate system includes a u-coordinate and a v-coordinate. The camera coordinate system and the display coordinate system are related by a transform based on the intrinsic parameters of the camera. Thus, when the three-dimensional coordinates of a point in the camera coordinate system and the intrinsic parameters of the camera are known, the two-dimensional coordinates of the point in the display coordinate system can be determined. In various implementations, the i-axis is parallel to the u-axis and the j-axis is parallel to the v-axis.

The virtual cockpit 160 is associated with a three-dimensional device-world coordinate system (represented by the axes 184) in which a point in the device-world coordinate system includes an X-coordinate, a Y-coordinate, and a Z-coordinate. The device-world coordinate system and the display coordinate system are related by a transform based on the pose of the perspective (sometimes referred to as the "virtual camera") in the device-world coordinate system, e.g., the location and orientation at which the virtual room 160 is being viewed. Thus, when the three-dimensional coordinates of a point in the device-world coordinate system and the pose of the perspective are known, the two-dimensional coordinates of the point in the display coordinate system can be determined.

In various implementations, the pose of the perspective is fixed. For example, in various implementations, the pose of the perspective is fixed at a location a perpendicular distance (e.g., eighteen inches) away from the center of the display 104, looking at the center of the display 104. In various implementations, the pose of the perspective is dynamic, e.g., based on a perspective of a user with respect to the device 103.

In various implementations, a representation of a physical object may be displayed at a location on the display 104 corresponding to the location of the physical object in the physical environment 100. For example, in FIG. 1A, the coin representation 172 is displayed at a location on the display 104 corresponding to the location in the physical environment of the physical coin 102. Similarly, a virtual object may be displayed at a location on the display 104 corresponding to a location in the physical environment 100. For example, in FIG. 1A, the virtual glow 164 is displayed at a location on the display 104 corresponding to a location in the physical environment 100 around the physical coin 102. Because the location on the display is related to the location in the physical environment using a transform based on the pose of the device 103, as the device 103 moves in the physical environment 100, the location on the display 104 of the coin representation 172 changes. Similarly, as the device 103 moves, the device 103 corresponding changes the location on the display 104 of the virtual glow 164 such that it appears to maintain its location in the physical environment 100 around the physical coin 102. A virtual object that, in response to movement of the device 103, changes location on the display 104 to maintain its appearance at the same location in the physical environment 100 may be referred to as a "world-locked" virtual object or a "physical-world-locked" virtual object.

To render a physical-world-locked virtual object, the device 103 determines one or more sets of three-dimensional coordinates in the physical-world coordinate system for the virtual object (e.g., a set of three-dimensional coordinates in the physical-world coordinate system for each vertex of the virtual object). The device 103 transforms the one or more sets of three-dimensional coordinates in the physical-world coordinate system into one or more sets of three-dimensional coordinates in the camera coordinate system using a transform based on the pose of the device 103. The device transforms the one or more sets of three-dimensional coordinates in the camera coordinate system into one or more sets of two-dimensional coordinates in the display coordinate system using a transform based on the intrinsic parameters of the camera. Finally, the device 103 renders the virtual object on the display 104 using the two-dimensional coordinates in the display coordinate system.

A virtual object that, in response to movement of the device 103, maintains its location on the display 104 may be referred to as a "device-locked" virtual object or a "display-locked" virtual object. For example, in FIG. 1A, the virtual close button 165 is displayed at a location on the display 104 that does not change in response to movement of the device 103.

To render a display-locked virtual object, the device 103 determines one or more sets of two-dimensional coordinates in the display coordinate system for the virtual object (e.g., a set of two-dimensional coordinates in the display coordinate system for each vertex (or pixel) of the virtual object). Then, the device 103 renders the virtual object on the display 104 using the two-dimensional coordinates in the display coordinate system.

In various implementations, a virtual object may be displayed at a location on the display 104 corresponding to a location in the virtual cockpit 160. For example, in FIG. 1A, the virtual pilot 161 is displayed at a location on the display 104 corresponding to a location in the virtual cockpit 160, e.g., on the floor of the virtual cockpit 160. Whereas a virtual object that, in response to movement of the device 103, maintains its appearance at the same location in the physical environment 100 is referred to as a physical-world-locked object, a virtual object that, in response to movement of the device 103, maintains its appearance at the same location in the virtual cockpit 160 may be referred to as a "room-locked" virtual object or a "device-world-locked" virtual object.

To render a device-world-locked virtual object, the device 103 determines one or more sets of three-dimensional coordinates in the device-world coordinate system for the virtual object (e.g., a set of three-dimensional coordinates in the device-world coordinate system for each vertex of the virtual object). The device 103 transforms the one or more sets of three-dimensional coordinates in the device-world coordinate system into one or more sets of two-dimensional coordinates in the display coordinate system using a transform based on the pose of the perspective. Finally, the device 103 renders the virtual object on the display 104 using the two-dimensional coordinates in the display coordinate system.

In various implementations, a device-world-locked virtual object, in response to movement of the device 103, maintains its location on the display 104. In various implementations, a device-world-locked virtual object, in response to movement of the device 103, changes its location on the display 104 to maintain its appearance at the same location in the virtual cockpit 160. For example, if the virtual cockpit 160 is displayed with a parallel projection or a fixed perspective, a device-world-locked virtual object maintains its location on the display 104 in response to movement of the device 103. However, if the virtual cockpit 160 is displayed with a dynamic perspective (e.g., based on a perspective of a user with respect to the device 103), a device-world-locked virtual object may change its location on the display 104 in response to movement of the device 103 with respect to the perspective of the user to maintain its appearance at the same location in the virtual cockpit 160.

In various implementations, the location in the virtual cockpit 160 of a device-world-locked virtual object changes over time. Accordingly, the location on the display 104 of the device-world-locked virtual object correspondingly changes over time to appear at the changed location in the virtual cockpit 160. For example, in FIG. 1A, the virtual pilot 161 is displayed at a location on the display 104 corresponding to a first pilot location in the virtual cockpit 60 (in front of the virtual viewport 162) and, in FIG. 1B, the virtual pilot 161 is displayed at a location on the display 104 corresponding to a second pilot location in the virtual cockpit 160 (in front of the virtual hatch 163).

FIG. 1A illustrates the first physical environment 100 at a first time. At the first time, the device 103 is at a first location in the first physical environment 100. At the first time, the device 103 detects the physical coin 102 in the first physical environment 100. In response to detecting the physical coin 102, the device 103 displays the virtual glow 164 around the coin representation 172. Thus, the first MR application indicates that a physical object corresponding to resources has been detected. Further, in response to detecting the physical coin 102, the first MR application instructs the user to move the device 103 into a spatial relationship with the physical coin 102 that satisfies one or more display criteria. For example, MR application instructs the user to move the device 103 closer to the physical coin 102 (e.g., the virtual pilot 161 says "Let's put her down next to that money!"). Thus, the device 103 provides feedback regarding the one or more display criteria. In FIG. 1A, because the spatial relationship between the device 103 and the physical coin 102 does not satisfy the one or more display criteria, the virtual hatch 163 is closed.

Figure 1B:
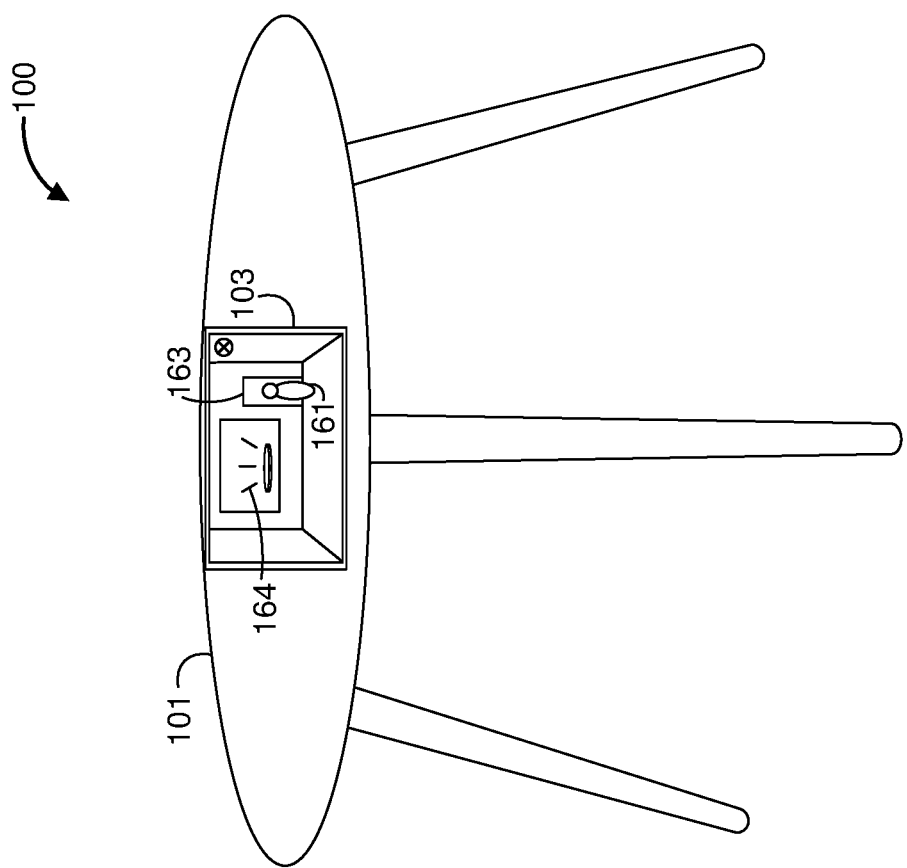

FIG. 1B illustrates the first physical environment 100 at a second time subsequent to the first time. At the second time, the device 103 is at a second location in the first physical environment 100 within a threshold distance of the physical coin 102 on (and perpendicular to) the physical table 101. In response to determining that the spatial relationship between the device 103 and the physical coin 102 satisfies the one or more display criteria (e.g., in response to determining that the device 103 is within the threshold distance of the physical coin 102), the virtual hatch 163 is open. In various implementations, the virtual hatch 163 is open in further response to determining that the spatial relationship between the device 103 and the physical table 101 satisfies one or more additional display criteria (e.g., that the device 103 is perpendicular to the physical table 101).

In FIG. 1B, the virtual glow 164 is brighter in response to the device 103 moving closer to the physical coin 102. Thus, device 103 provides feedback regarding the spatial relationship between the device 103 and the physical coin 102.

Figure 1C:
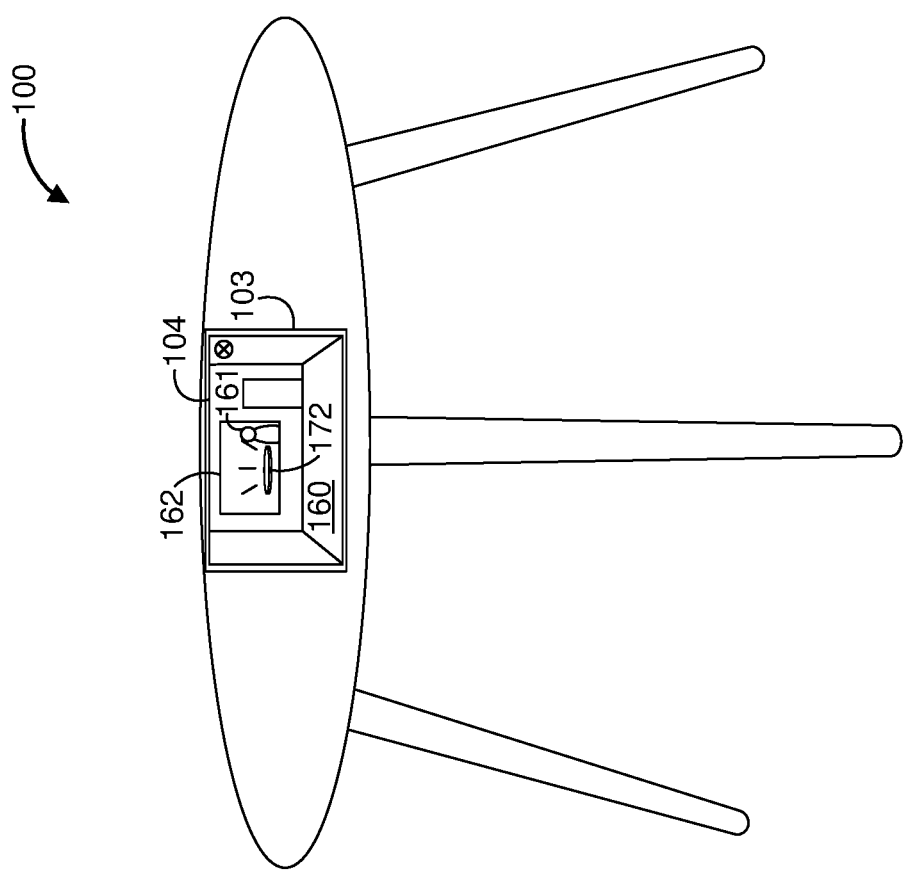

FIG. 1C illustrates the first physical environment 100 at a third time subsequent to the second time. At the third time, the device 103 is at the second location in the first physical environment 100. At the third time, the virtual pilot 161 has exited the virtual cockpit 160 and is visible through the virtual viewport 162 at a location next to the coin representation 172. Thus, whereas the virtual pilot 161 is a device-world-locked object in FIG. 1B, the virtual pilot 161 is a physical-world-locked object in FIG. 1C. In various implementations, the virtual pilot 161 transitions between being a device-world-locked object and a physical-world-locked object as described in U.S. Provisional Patent App. No. 63/351,194, filed on Jun. 10, 2022, which is hereby incorporated by reference. In various implementations, the virtual hatch 163 is open when the spatial relationship between the device 103 and the physical coin satisfies the one or more display criteria, but the virtual pilot 161 does not exit the virtual cockpit 161 until a user input is received, e.g., by touching the display 104 at the location the virtual pilot 161 or providing a verbal command.

Figure 1D:
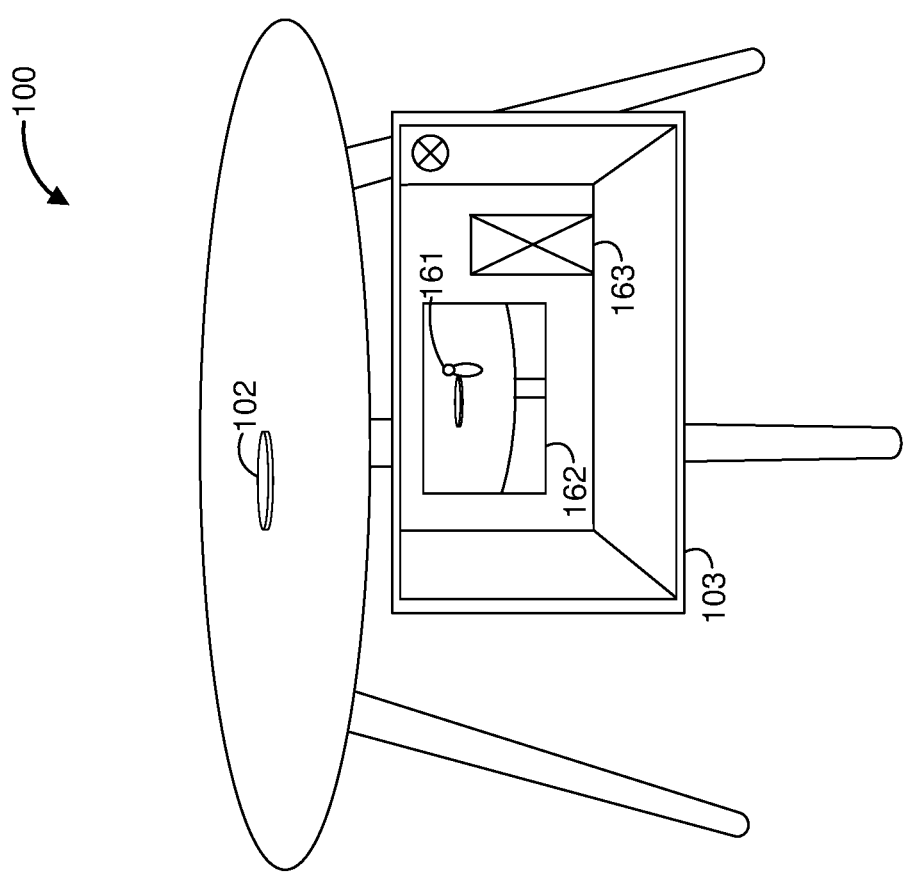

FIG. 1D illustrates the first physical environment 100 at a fourth time subsequent to the third time. At the fourth time, device 103 is at a third location in the first physical environment. At the fourth time, the virtual pilot 161 is visible through the virtual viewport 162 as a physical-world-locked object. After an amount of time in which the virtual pilot 161 interacts with the physical object to obtain resources, the first MR application ceases to display the virtual glow 164 and instructs the user to move the device 103 into the spatial relationship with the physical coin 102 that satisfies the one or more display criteria. For example, the first MR application instructs the user to move the device 103 closer to the physical coin 102 (e.g., the virtual pilot 161 says "Ready for pickup!"). In FIG. 1D, because the spatial relationship between the device 103 and the physical coin 102 does not satisfy the one or more display criteria, the virtual hatch 163 is closed.

Figure 1E:
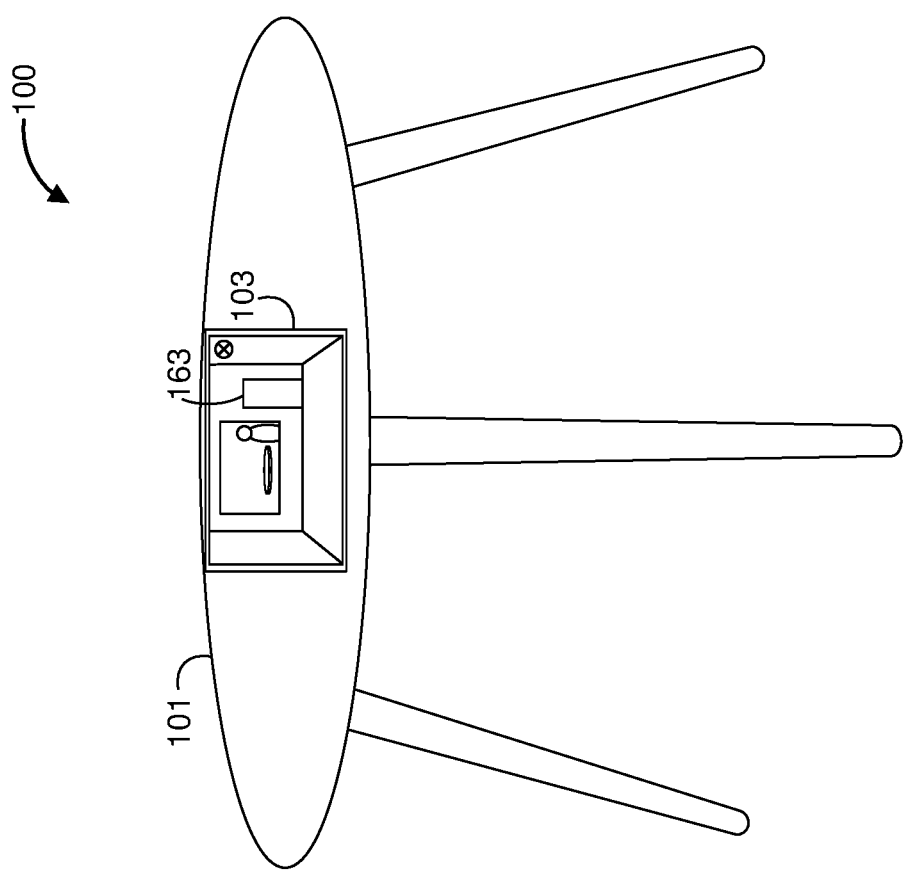

FIG. 1E illustrates the first physical environment 100 at a fifth time subsequent to the fourth time. At the fifth time, the device 103 is at the second location in the first physical environment 100 within the threshold distance of the physical coin 102 on (and perpendicular to) the physical table 101. In response to determining that the spatial relationship between the device 103 and the physical coin 102 satisfies the one or more display criteria (e.g., in response to determining that the device 103 is within the threshold distance of the physical coin 102), the virtual hatch 163 is open.

Figure 1F:
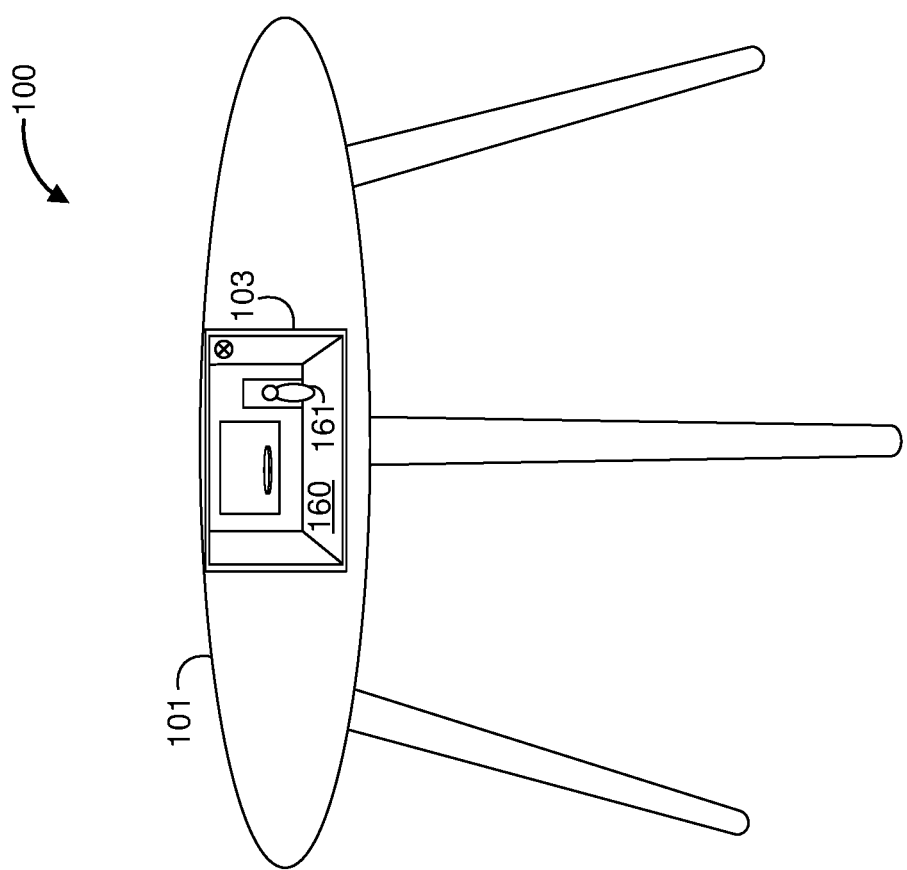

FIG. 1F illustrates the first physical environment 100 at a sixth time subsequent to the second time. At the sixth time, the device 103 is at the second location in the first physical environment 100. At the sixth time, the virtual pilot 161 has entered the virtual cockpit 160. Thus, whereas the virtual pilot 161 is a physical-world-locked object in FIG. 1E, the virtual pilot 161 is a device-world-locked object in FIG. 1F. In various implementations, the virtual pilot 161 transitions between being a physical-world-locked object and a device-world-locked object as described in U.S. Provisional Patent App. No. 63/351,194, filed on Jun. 10, 2022, which is hereby incorporated by reference.

Figure 1G:
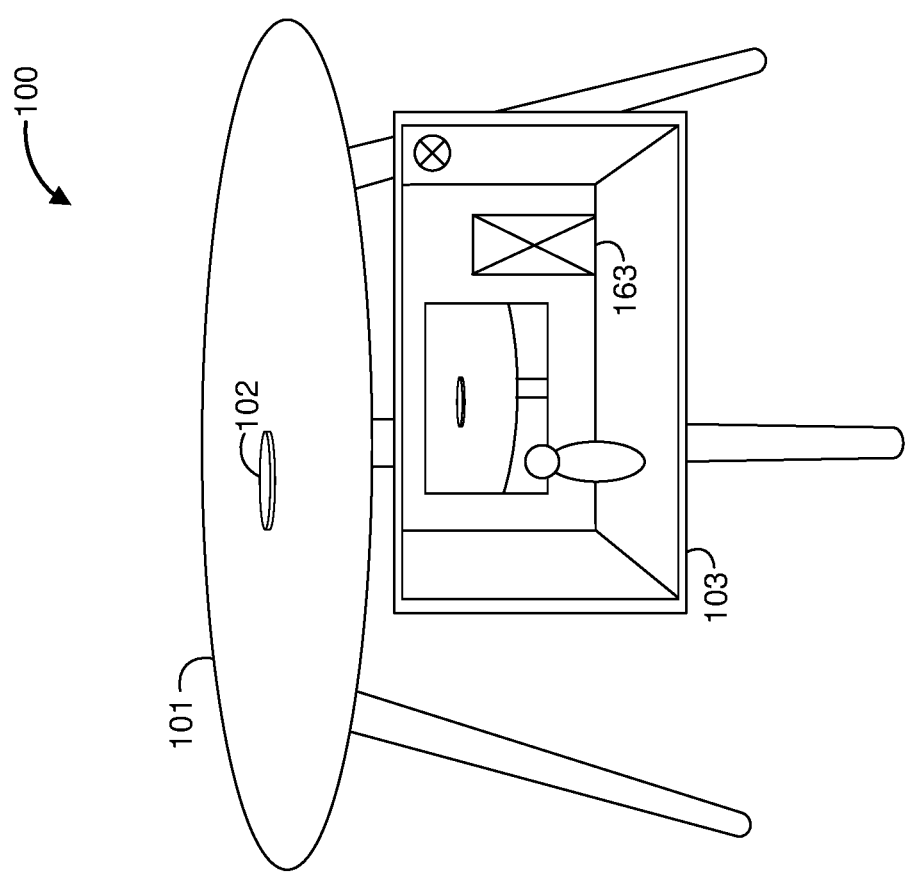

FIG. 1G illustrates the first physical environment 100 at a seventh time subsequent to the sixth time. At the seventh time, the device 103 is at the third location in the first physical environment 100. In FIG. 1G, because the spatial relationship between the device 103 and the physical coin 102 does not satisfy the one or more display criteria, the virtual hatch 163 is closed.

FIGS. 2A-2D illustrate a second physical environment 200 at a series of times. The second physical environment 200 includes a physical wall 201, a physical portrait photograph 202 on the physical wall 201, and a physical landscape painting 203 on the physical wall 201. The second physical environment 200 includes the physical electronic device 103 (hereinafter "device 103") including the display 104 via which the device 103 displays a second mixed reality (MR) application.

The second MR application includes a physical environment representation 270 of the second physical environment 200 and the virtual close button 165 which, when selected by a user, causes the device 103 to cease displaying the second MR application. When a spatial relationship between the device 103 and a particular object satisfies one or more display criteria, virtual content is displayed in association with the particular object. In FIGS. 2A-2D, the spatial relationship satisfies the one or more display criteria when the angles between the device 103 and the object are within defined ranges for the object.

Figure 2A:
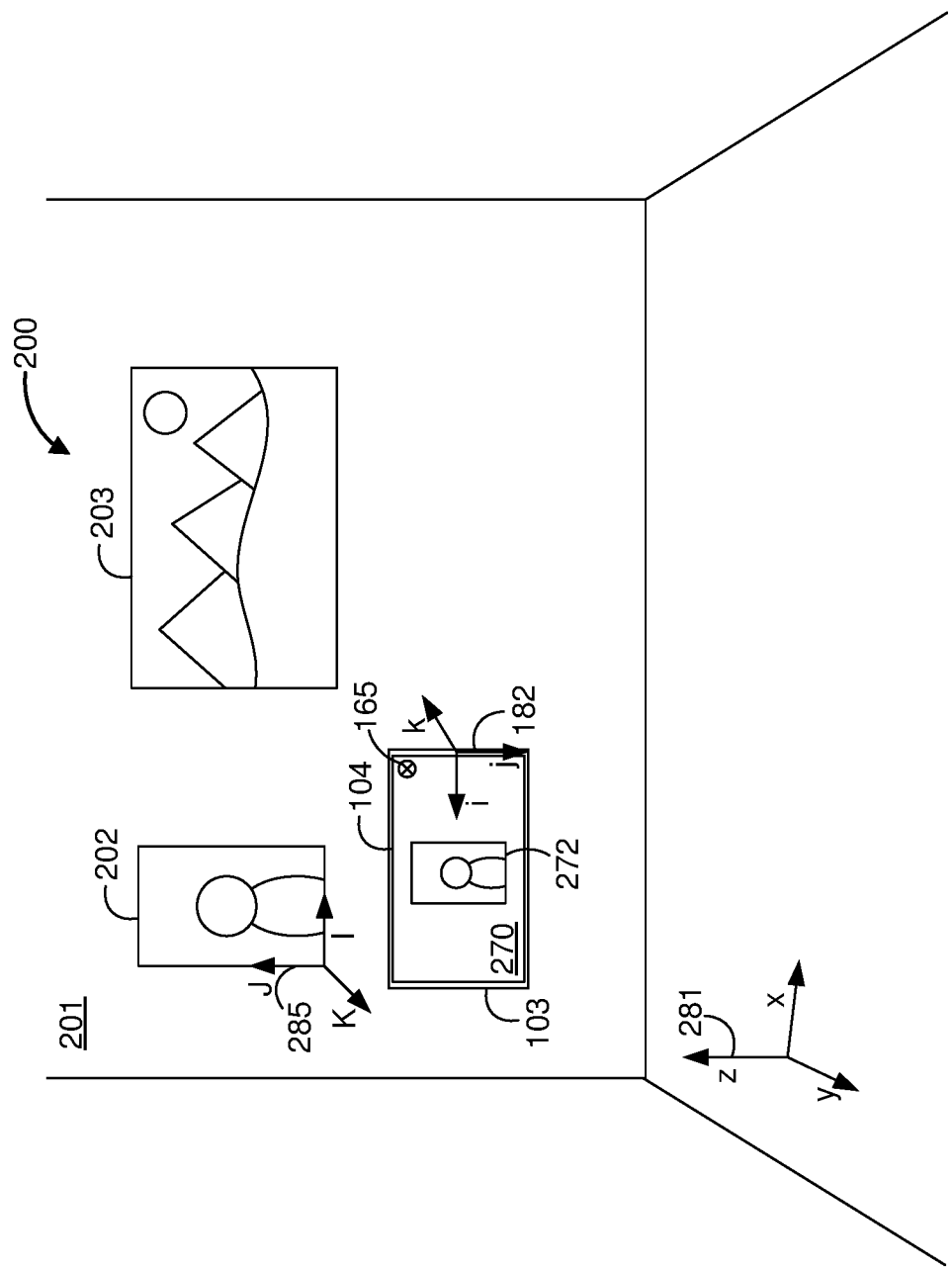
FIGS. 2A-2D illustrate a second physical environment at a series of times.

FIG. 2A illustrates the second physical environment 200 at a first time. At the first time, the device 103 is at a first location and first orientation in the second physical environment 200. At the first time, the physical environment representation 270 includes a photograph representation 272 of the physical portrait photograph 202. At the first time, the device 103 detects the physical portrait photograph 202 in the second physical environment 200 and determines whether the spatial relationship between the device 103 and the physical portrait photograph 202 meets the one or more display criteria.

To determine whether the spatial relationship between the device 103 and the physical portrait photograph 202 meets the one or more display criteria, the device 103 determines an orientation of the device 103 with respect to the physical portrait photograph 202. The second physical environment 200 is associated with a three-dimensional physical-world coordinate system (represented by the axes 281) in which a point in the physical-world coordinate system includes an x-coordinate, a y-coordinate, and a x-coordinate. The camera is associated with a three-dimensional camera coordinate system (represented by the axes 182) in which a point in the camera coordinate system includes an i-coordinate, a j-coordinate, and a k-coordinate. The k-axis of the camera coordinate system corresponds to the optical axis of the camera. Similarly, the physical portrait photograph 202 is associated with a three-dimensional object coordinate system (represented by the axes 285) including an I-coordinate, a J-coordinate, and a K-coordinate. The I-axis is parallel to a horizontal edge of the physical portrait photograph 202, the J-axis is parallel to a vertical edge of the physical portrait photograph 202, and the K-axis is perpendicular to the physical portrait photograph 202.

The camera coordinate system and the physical-world coordinate system are related by a transform based on the pose (e.g., the three-dimensional location and three-dimensional orientation) of the camera (and the device 103) in the physical-world coordinate system. The three-dimensional location can be defined by a set of distances corresponding to translations along the x-axis, y-axis, and z-axis and the three-dimensional orientation can be defined by a set of angles corresponding to rotations about the x-axis, y-axis, and z-axis.

Similarly, the object coordinate system and the physical-word coordinate system are related by a transform based on the pose (e.g., the three-dimensional location and three-dimensional orientation) of the physical portrait photograph 202 in the physical-world coordinate system. Further, the camera coordinate system and the object coordinate system are related by a transform based on the pose (e.g., the three-dimensional location and three-dimensional orientation) of the camera (and the device 103) in the object coordinate system. The three-dimensional location can be defined by a set of distances corresponding to translations along the I-axis, J-axis, and K-axis and the three-dimensional orientation can be defined by a set of angles corresponding to rotations about the I-axis, J-axis, and K-axis.

Thus, in FIG. 2A, the device 103 determines that the angles relating the camera coordinate system and the object coordinate system are 180 degrees around the I-axis, 180 degrees around the J-axis, and 180 degrees around the K-axis. The ranges for the physical portrait photograph 202 are between 170 and 190 degrees around the I-axis (e.g., with the device 103 approximately level), between 125 and 145 degrees around the J-axis (e.g., with the device 103 and the physical portrait photograph 202 forming between a 35 and 55 degree angle in the I-K plane), and between −10 and 10 degrees or between 170 and 190 degrees around the K-axis (e.g., in a landscape orientation). Because the device 103 determines that the angle for the J-axis is not within the corresponding range, the device 103 does not display virtual content.

Figure 2B:
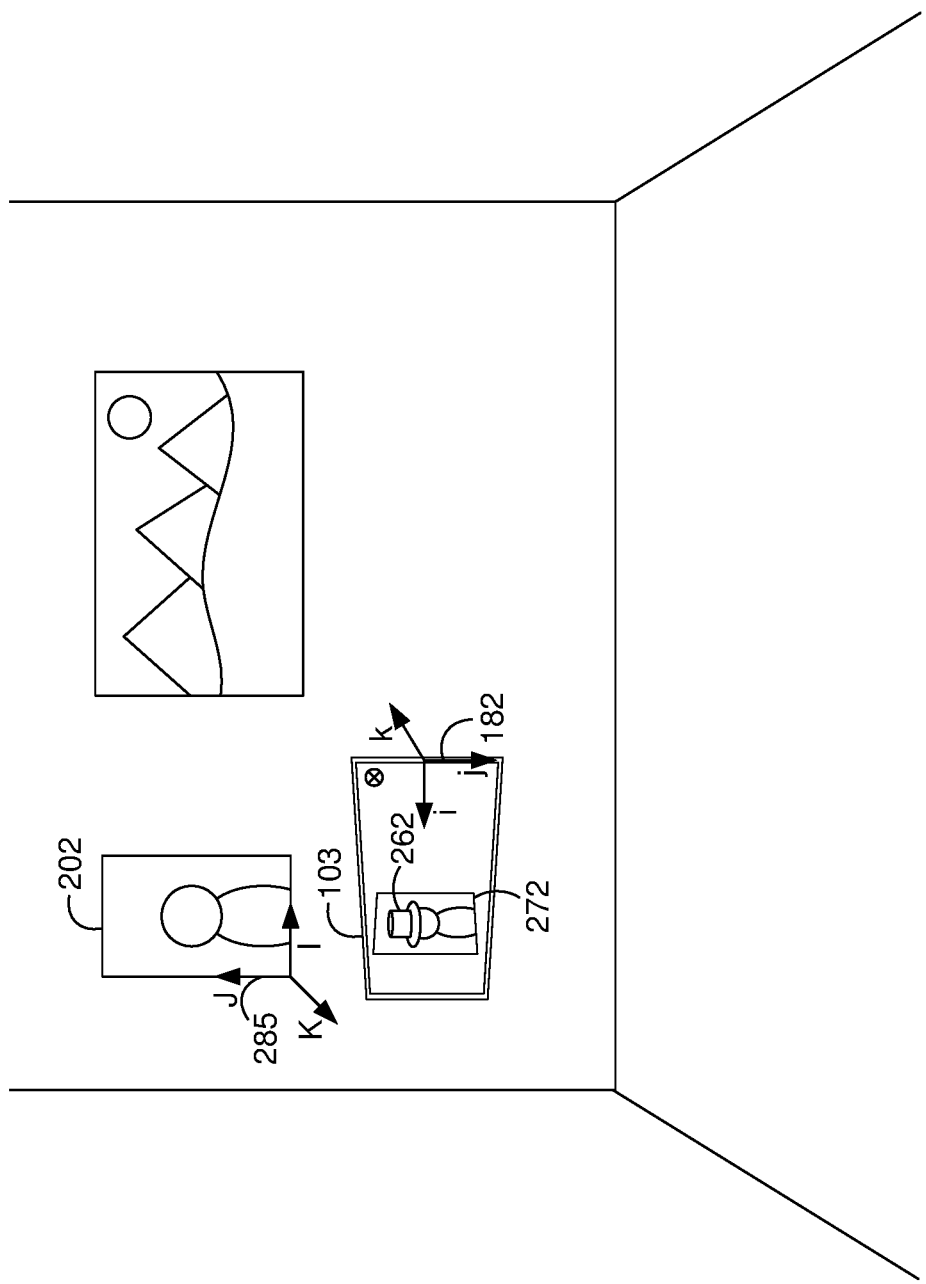

FIG. 2B illustrates the second physical environment 200 at a second time subsequent to the first time. At the second time, the device 103 is at a first location and second orientation in the second physical environment 200. At the second time, the device 103 detects the physical portrait photograph 202 in the second physical environment 200 and determines whether the spatial relationship between the device 103 and the physical portrait photograph 202 meets the one or more display criteria.

In FIG. 2B, the device 103 determines that the angles relating the camera coordinate system and the object coordinate system are 180 degrees around the I-axis, 135 degrees around the J-axis, and 180 degrees around the K-axis. The ranges for the physical portrait photograph 202 are between 170 and 190 degrees around the I-axis (e.g., with the device 103 approximately level), between 125 and 145 degrees around the J-axis (e.g., with the device 103 and the physical portrait photograph 202 forming between a 35 and 55 degree angle in the I-K plane), and between −10 and 10 degrees or between 170 and 190 degrees around the K-axis (e.g., with the device 103 in a landscape orientation). Because the device 103 determines that all the angles are within their corresponding range, the device 103 displays virtual content. In particular, the device 103 displays a virtual top hat 262 in association with the photograph representation 272.

Figure 2C:
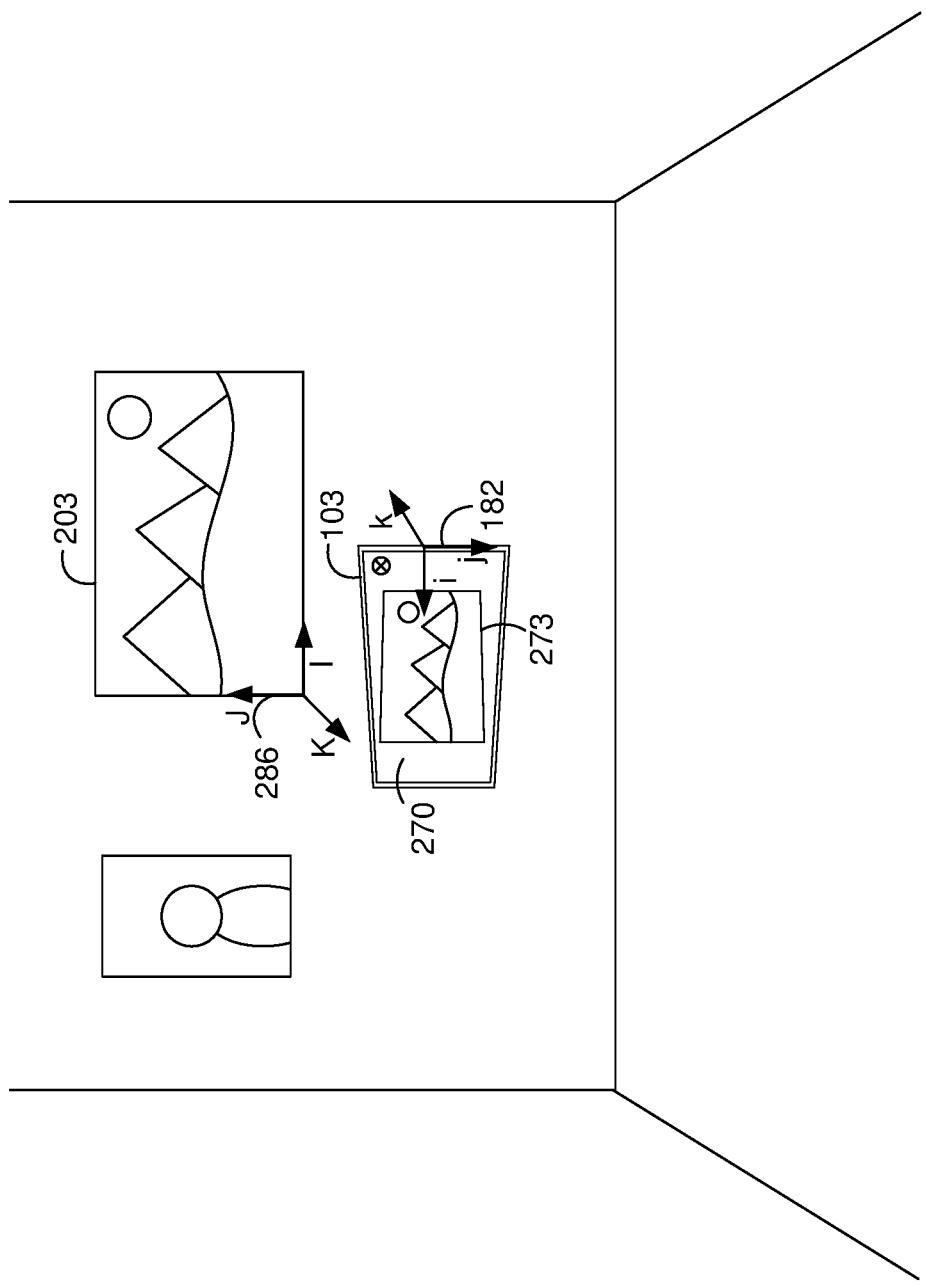

FIG. 2C illustrates the second physical environment 200 at a third time subsequent to the second time. At the third time, the device 103 is at a second location and the second orientation in the second physical environment 200. At the third time, the physical environment representation 270 includes a painting representation 273 of the physical landscape painting 203. At the third time, the device 103 detects the physical landscape painting 203 in the second physical environment 200 and determines whether the spatial relationship between the device 103 and the physical landscape painting 203 meets one or more display criteria.

The physical landscape painting 203 is associated with a three-dimensional object coordinate system (represented by the axes 286) including an I-coordinate, a J-coordinate, and a K-coordinate. The I-axis is parallel to a horizontal edge of the physical landscape painting 203, the J-axis is parallel to a vertical edge of the physical landscape painting 203, and the K-axis is perpendicular to the physical landscape painting 203.

Further, the camera coordinate system and the object coordinate system are related by a transform based on the pose (e.g., the three-dimensional location and three-dimensional orientation) of the camera (and the device 103) in the object coordinate system. The three-dimensional location can be defined by a set of distances corresponding to translations along the I-axis, J-axis, and K-axis and the three-dimensional orientation can be defined by a set of angles corresponding to rotations about the I-axis, J-axis, and K-axis.

Thus, in FIG. 2C, the device 103 determines that the angles relating the camera coordinate system and the object coordinate system are 180 degrees around the I-axis, 135 degrees around the J-axis, and 180 degrees around the K-axis. The ranges for the physical landscape painting 203 are between 170 and 190 degrees around the I-axis (e.g., with the device 103 approximately level), between 170 and 190 degrees around the J-axis (e.g., with the device 103 and the physical landscape painting 203 substantially parallel), and between −10 and 10 degrees or between 170 and 190 degrees around the K-axis (e.g., with the device 103 in a landscape orientation). Because the device 103 determines that the angle for the J-axis is not within the corresponding range, the device 103 does not display virtual content.

Figure 2D:
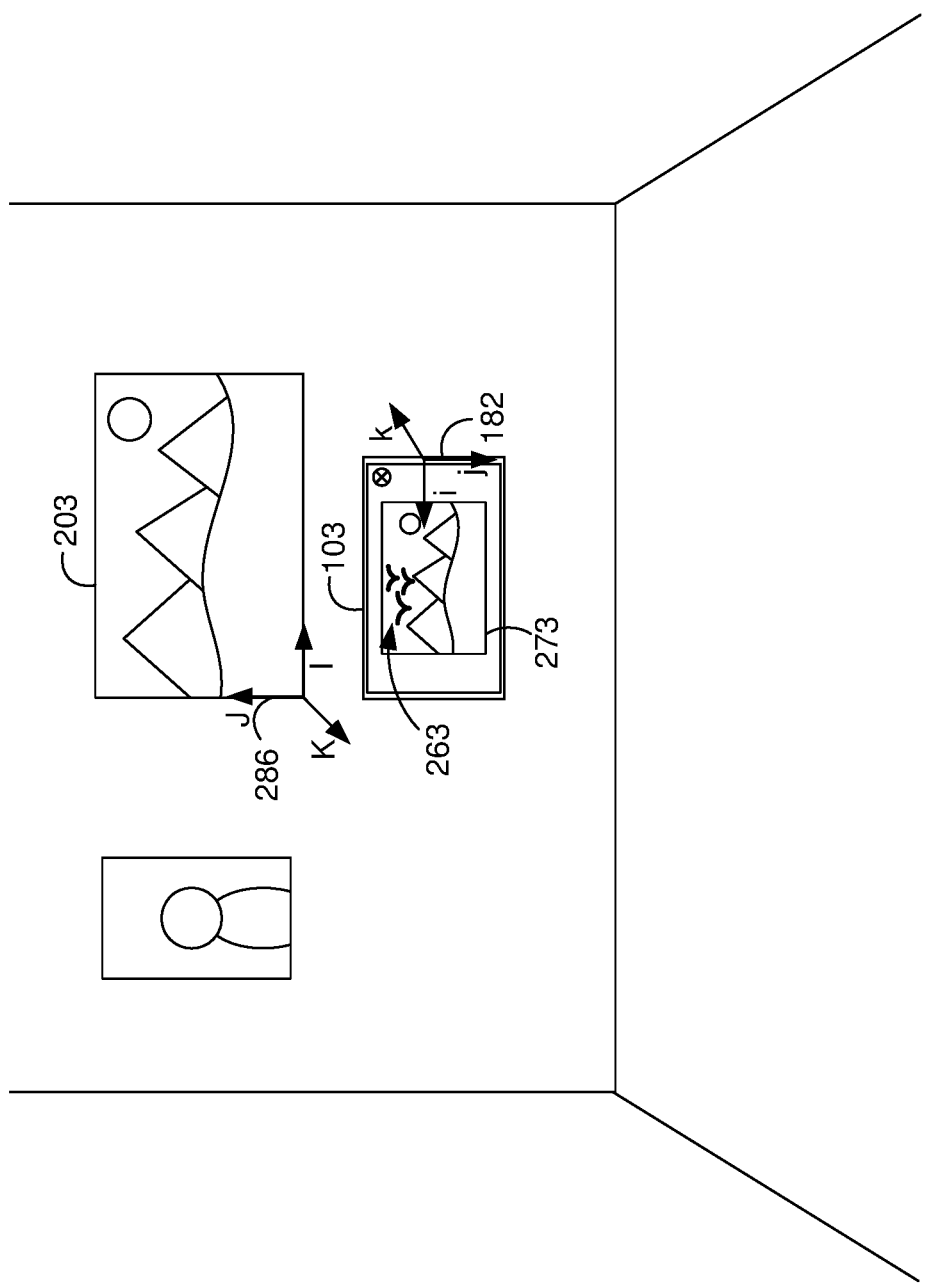

FIG. 2D illustrates the second physical environment 200 at a fourth time subsequent to the third time. At the fourth time, the device 103 is at the second location and the first orientation in the second physical environment 200. At the fourth time, the device 103 detects the physical landscape painting 203 in the second physical environment 200 and determines whether the spatial relationship between the device 103 and the physical landscape painting 203 meets the one or more display criteria.

In FIG. 2D, the device 103 determines that the angles relating the camera coordinate system and the object coordinate system are 180 degrees around the I-axis, 180 degrees around the J-axis, and 180 degrees around the K-axis. The ranges for the physical landscape painting 203 are between 170 and 190 degrees around the I-axis (e.g., with the device 103 approximately level), between 170 and 190 degrees around the J-axis (e.g., with the device 103 and the physical portrait photograph 202 approximately parallel), and between −10 and 10 degrees or between 170 and 190 degrees around the K-axis (e.g., with the device 103 in a landscape orientation). Because the device 103 determines that all the angles are within their corresponding range, the device 103 displays virtual content. In particular, the device 103 displays virtual birds 263 in association with the painting representation 273.

Figure 3:
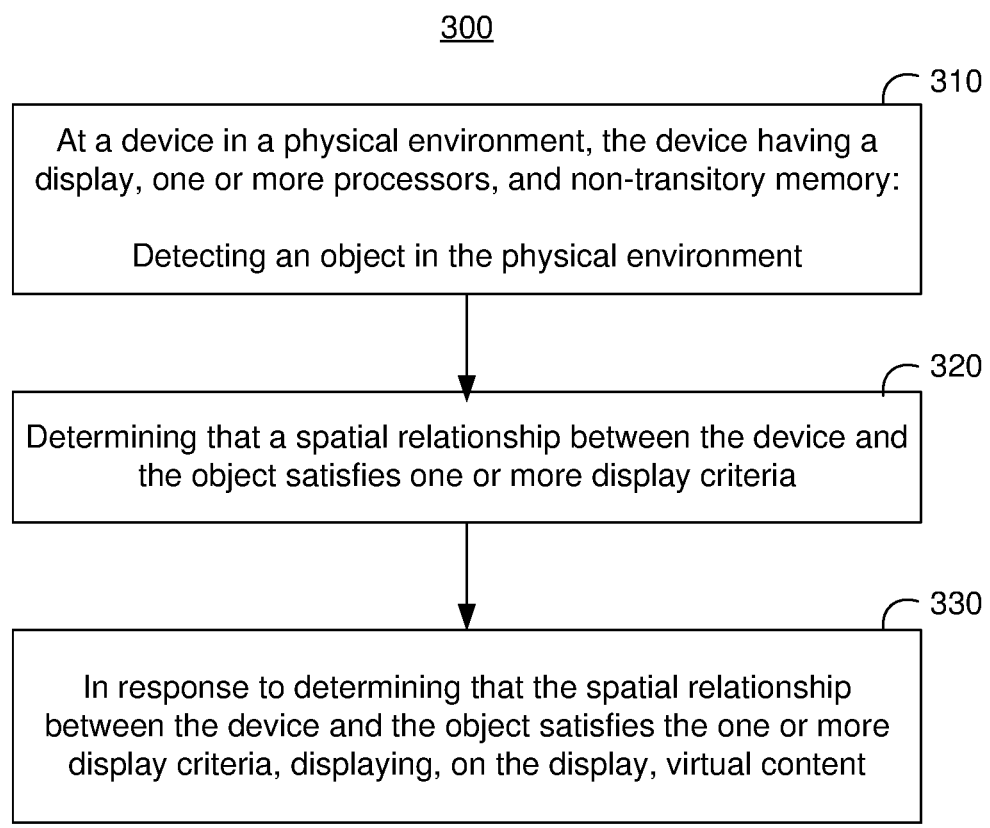
FIG. 3 illustrates a flowchart representation of a method of displaying a virtual object in accordance with some implementations.

FIG. 3 is a flowchart representation of a method 300 of displaying virtual content in accordance with some implementations. In various implementations, the method 300 is performed by a device in a physical environment. In various implementations, the method 300 is performed by a device including a display, one or more processors, and non-transitory memory. In some implementations, the method 300 is performed by processing logic, including hardware, firmware, software, or a combination thereof. In some implementations, the method 300 is performed by a processor executing instructions (e.g., code) stored in a non-transitory computer-readable medium (e.g., a memory).

The method 300 begins, in block 310, with the device detecting an object in the physical environment. In various implementations, the device captures an image of the physical environment (e.g., using a camera) and detects the object in the image of the physical environment.

The method 300 continues, in block 320, with the device determining that a spatial relationship between the device and the object satisfies one or more display criteria. Thus, in various implementations, determining that the spatial relationship between the device and the object satisfies one or more display criteria includes determining the spatial relationship between the device and the object. In various implementations, determining the spatial relationship between the device and the object includes determining a distance between the device and the object. In various implementations, the distance is a Euclidean distance. In various implementations, determining the spatial relationship between the device and the object includes determining a relative angle of the device with respect to the object. In various implementations, determining the relative angle of the device with respect to the object includes determining three rotations of the device with respect to the object, one for each of three dimensions.

Thus, in various implementations, determining that the spatial relationship between the device and the object satisfies one or more display criteria includes determining the one or more display criteria. In various implementations, the one or more display criteria are based on an object type of the detected object. For example, in FIGS. 2A-2D, the one or more display criteria for the physical portrait photograph 202 (with rotation about the J-axis between 125 and 145 degrees) are different than the one or more display criteria for the physical landscape painting 203 (with rotation about the J-axis between 170 and 190 degrees).

In various implementations, determining that the spatial relationship between the device and the object satisfies the one or more display criteria includes determining that a distance between the device and the object is less than a display threshold. For example, in FIG. 1B, the device 103 determines that the distance between the device 103 and the physical coin 102 is less than a display threshold. In various implementations, determining that the spatial relationship between the device and the object satisfies the one or more display criteria includes determining that an angle of the device with respect to the object is within a display range. For example, in FIG. 2B, the device 103 determines that an angle of the device 103 with respect to the physical portrait photograph 202 (e.g., the 45-degree angle in the I-K plane) is within a display range (e.g., between 35 and 55 degrees).

The method 300 continues, in block 330, with the device, in response to determining that the spatial relationship between the device and the object satisfies the one or more display criteria, displaying, on the display, virtual content. For example, in FIG. 1B, in response to determining that the distance between the device 103 and the physical coin 102 is less than a display threshold, the device 103 displays the virtual hatch 163 opening and the virtual pilot 161 exiting the virtual cockpit 160. As another example, in FIG. 2B, in response to determining that an angle of the device 103 with respect to the physical portrait photograph 202 is within the display range, the device 103 displays the virtual top hat 262.

In various implementations, displaying the virtual content includes displaying the virtual content in association with an image of the physical environment. For example, in FIG. 1C, the device 103 displays the virtual pilot 161 in association with the physical environment representation 170 interacting with the coin representation 172. As another example, in FIG. 2B, the device 103 displays the virtual top hat 262 in association with the physical environment representation 270 overlaid on the photograph representation 272. Thus, in various implementations, displaying the virtual content includes displaying the virtual content in association with the object.

In various implementations, determining that the spatial relationship between the device and the object triggers the display of new virtual content (e.g., as in FIGS. 2A-2D). However, in various implementations, determining that the spatial relationship between the device and the object triggers story progression or game progression (e.g., as in FIGS. 1A-1G). Thus, in various implementations, the method 300 includes displaying a first portion of content prior to determining that the spatial relationship between the device and the object satisfies the one or more display criteria, wherein displaying the virtual content includes displaying a second portion of the content. For example, in various implementations, the first portion of content includes a virtual character performing a first action and the second portion of content includes the virtual character performing a second action. For example, in FIG. 1D, the device 103 displays the virtual pilot 161 interacting with the coin representation 172. Then, in FIG. 1F, in response to detecting that the distance between the device 103 and the physical coin 102 is less than the display distance, the device 103 displays the virtual pilot 161 entering the virtual cockpit 160.

In various implementations, displaying the virtual content is displayed in response to determining both that the spatial relationship between the device and the object satisfies the one or more display criteria and that one or more additional criteria are satisfied. For example, in various implementations, the one or more additional criteria are satisfied when a user input is detected. Thus, in various implementations, displaying the virtual content is performed in further response to a user input. For example, in FIG. 1C, the device 103 displays the virtual pilot 161 exiting the virtual cockpit 160 in response to determining that the spatial relationship between the device 103 and the physical coin 102 is less than a threshold distance and that a user input has been received. As another example, in various implementations, the one or more additional criteria are satisfied when a spatial relationship between the device and a second object satisfies one or more additional display criteria. Thus, in various implementations, displaying the virtual content is performed in further response to determining that a spatial relationship between the device and a second object satisfies one or more additional display criteria. For example, in FIG. 1C, the device 103 displays the virtual pilot 161 exiting the virtual cockpit 160 in response to determining that the distance between the device 103 and the physical coin 102 is less than a threshold distance and that the device 103 is perpendicular to the physical table 101.

In various implementations, the method 300 includes providing feedback regarding the spatial relationship between the device and the object. For example, in FIG. 1B, the virtual glow 162 displayed in association with the coin representation 172 is brightened as compared to FIG. 1A to indicate that the device 103 is closer to the physical coin 102. In various implementations, the method 300 includes providing feedback regarding the one or more display criteria. For example, in FIG. 1A, the device 103 indicates that the user should move the device 103 closer to the physical coin 102.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a device in a physical environment, the device having a display, one or more processors, and non-transitory memory;
detecting an object in the physical environment;
determining that a spatial relationship between the device and the object satisfies one or more display criteria; and
in response to determining that the spatial relationship between the device and the object satisfies the one or more display criteria, displaying, on the display, virtual content.

2. The method of claim 1, wherein determining that the spatial relationship between the device and the object satisfies the one or more display criteria includes determining that a distance between the device and the object is less than a display threshold.

3. The method of claim 1, wherein determining that the spatial relationship between the device and the object satisfies the one or more display criteria includes determining that angle of the device with respect to the object is within a display range.

4. The method of claim 1, wherein displaying the virtual content includes displaying the virtual content in association with an image of the physical environment.

5. The method of claim 1, wherein displaying the virtual content includes displaying the virtual content in association with the object.

6. The method of claim 1, further comprising displaying a first portion of content prior to determining that the spatial relationship between the device and the object satisfies the one or more display criteria, wherein displaying the virtual content includes displaying a second portion of the content.

7. The method of claim 6, wherein the first portion of content includes a virtual character performing a first action and the second portion of content includes the virtual character performing a second action.

8. The method of claim 1, wherein displaying the virtual content is performed in further response to a user input.

9. The method of claim 1, wherein displaying the virtual content is performed in further response to determining that a spatial relationship between the device and a second object satisfies one or more additional display criteria.

10. The method of claim 1, further comprising providing feedback regarding the spatial relationship between the device and the object.

11. The method of claim 1, further comprising providing feedback regarding the one or more display criteria.

12. A device comprising:
a display;
non-transitory memory; and
one or more processors to:
detect an object in the physical environment;
determine that a spatial relationship between the device and the object satisfies one or more display criteria; and
in response to determining that the spatial relationship between the device and the object satisfies the one or more display criteria, display on the display, virtual content.

13. The device of claim 12, wherein the one or more processors are to determine that the spatial relationship between the device and the object satisfies the one or more display criteria by determining that a distance between the device and the object is less than a display threshold.

14. The device of claim 12, wherein the one or more processors are to determine that the spatial relationship between the device and the object satisfies the one or more display criteria by determining that angle of the device with respect to the object is within a display range.

15. The device of claim 12, wherein the one or more processors are to display the virtual content in association with the object.

16. The device of claim 12, wherein the one or more processors are to display a first portion of content prior to determining that the spatial relationship between the device and the object satisfies the one or more display criteria and to display the virtual content by displaying a second portion of the content.

17. The device of claim 16, wherein the first portion of content includes a virtual character performing a first action and the second portion of content includes the virtual character performing a second action.

18. The device of claim 16, wherein the one or more processors are to display the virtual content in further response to a user input.

19. The device of claim 16, wherein the one or more processors are further to provide feedback regarding the spatial relationship between the device and the object with respect to the one or more display criteria.

20. A non-transitory memory storing one or more programs, which, when executed by one or more processors of a device including a display, cause the device to:
detect an object in the physical environment;
determine that a spatial relationship between the device and the object satisfies one or more display criteria; and
in response to determining that the spatial relationship between the device and the object satisfies the one or more display criteria, display on the display, virtual content.

* * * * *